Figure 1:
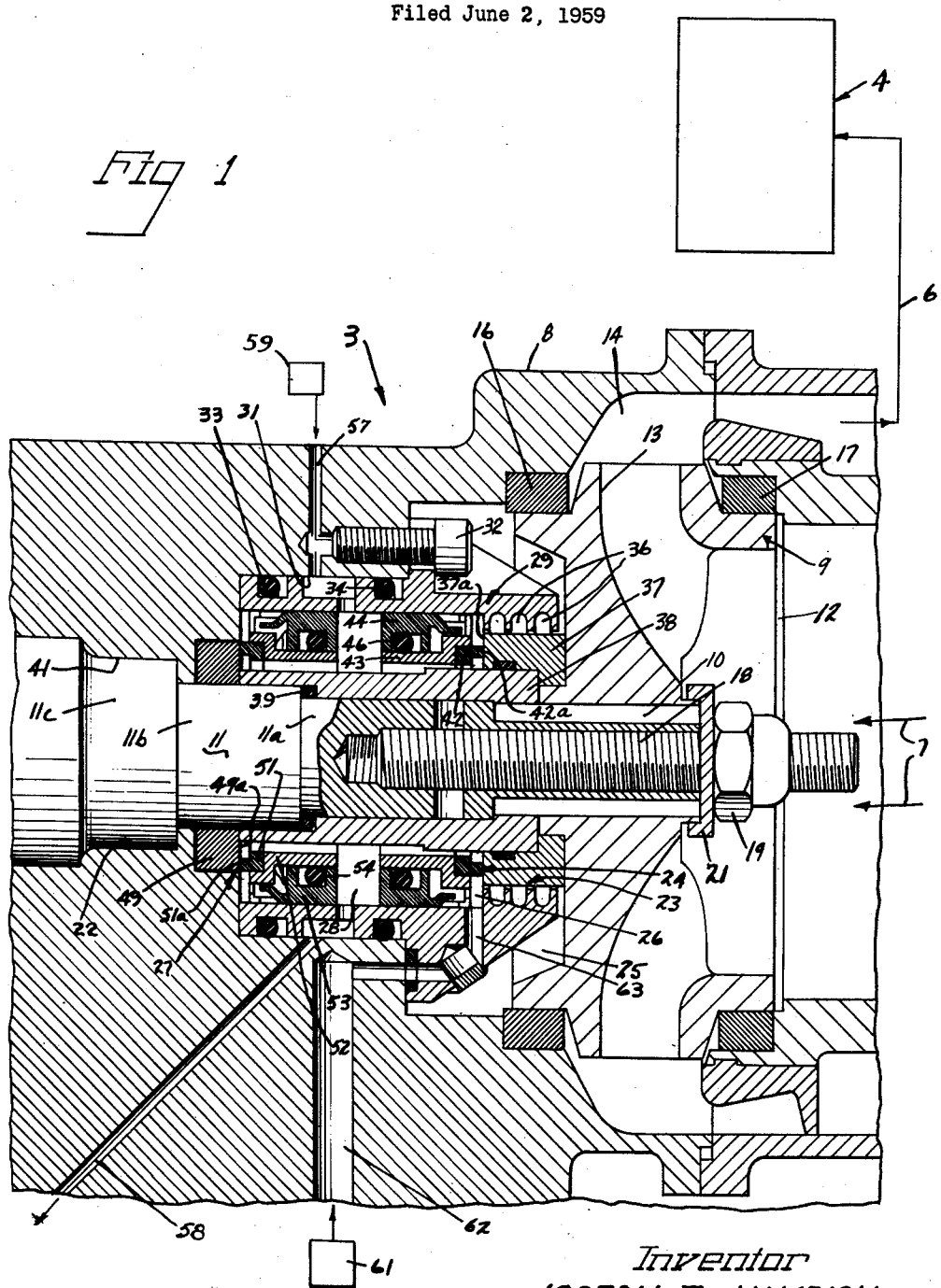

March 12, 1963   J. T. HAMRICK   3,081,095
LIQUID FLUORINE SEAL
Filed June 2, 1959

Inventor
JOSEPH T. HAMRICK
by Hill, Sherman, Meroni, Gross & Simpson Attys.

3,081,095
LIQUID FLUORINE SEAL
Joseph T. Hamrick, Euclid, Ohio, assignor to Thompson Ramo Wooldridge Inc., Cleveland, Ohio, a corporation of Ohio
Filed June 2, 1959, Ser. No. 817,622
12 Claims. (Cl. 277—1)

The present invention relates to improvements in pumps for pumping liquid fluorine and more particularly to a rotary pump and seal for the pump shaft which prevents the escape of fluorine and prevents the fluorine from burning the seal.

Liquid fluorine forms a protective fluoride coating on materials that come in contact with it. However, under abrasion, this coat, which is called a passivating surface, is rubbed off exposing the bare material. The bare material with abrasion generates heat to start combustion in liquid fluorine. This is encountered in pumps for pumping liquid fluorine which are provided with seals that have rubbing surfaces. Rotary pump seals commonly encounter rubbing speeds of 100 to 150 feet per second, which will cause the seals to be literally burned up in the liquid fluorine which supports combustion. Seals of the non-rubbing type such as labyrinth are satisfactory but do not form a positive leakproof seal and cannot be used in pump applications where absolute sealing is required.

Accordingly, it is an object of the present invention to provide a pump and seal for handling liquid fluorine which will provide an absolute seal against leakage and which will not burn up at operating speeds.

Another object of the invention is to provide an improved seal for a rotating member such as a pump shaft utilizing the absolute sealing properties of a face-to-face seal and utilizing the non-rubbing properties of a labyrinth seal for liquid fluorine in a combined seal assembly.

A further object of the invention is to provide an improved seal assembly for a rotating pump impeller shaft which is capable of providing an absolute seal against the leakage of fluorine, will not be burned up when exposed to a liquid fluorine, will not adversely affect the operation of the pump, and will prevent the leakage of lubricant into the pumping area.

Another object of the invention is to provide an improved method and apparatus for preventing the burning of a seal by creating a buffer zone of a non-burning diluting fluid forcing the fluorine away from the seal.

Other objects and advantages will become more apparent with the teaching of the principles of the invention in connection with the disclosure of the methods and preferred embodiment thereof in the specification, claims and drawings, in which:

FIGURE 1, the only figure in the drawings, is a vertical sectional view taken through the axis of a pump and seal assembly embodying the principles of the present invention.

As shown on the drawing:

A pump 3 is connected to deliver liquid fluorine to an apparatus for consuming the fluorine. The fluorine may be used as an oxidizer, and the apparatus 4 consists of a combustor for delivering gases to an engine such as a nozzle for a rocket engine or to a turbine or the like. Fuel is delivered to the apparatus 4 from another source (not shown) to mix with the fluorine. The fluorine is delivered through a line 6 connecting between the pump and the apparatus 4. Liquid fluorine flows into the pump through an intake indicated generally by the arrows 7.

The pump includes a pump housing 8 with a rotor or impeller 9 mounted on a pump drive shaft 11 having splines 10 and the rotor is positioned within a pump chamber 12 in the housing. The rotor has radially extending impeller passages 13 which centrifugally deliver liquid fluorine to a peripheral discharge chamber 14. Annular seals 16 and 17 are mounted in the housing and sealingly coact with the rotor axially on each side of the discharge chamber 14. The shaft 11 has an axially extending threaded end bore receiving a threaded stud 18, which in turn receives a threaded nut 19 to draw a washer 21 against the impeller and hold it on the end of the shaft 11.

The sealing assembly along the shaft includes a first rotary seal 23 of the non-rubbing type, shown as a labyrinth seal, positioned adjacent the pump rotor 9. The first rotary seal opens to a zone 25 in back of the rotor which, although isolated by the annular seal 16 from the pump peripheral discharge chamber 14, is under pressure and may be referred to as a pressure zone 25.

Axially behind the first rotary seal 23 is a second rotary seal 24 of the rubbing face-to-face type and the first seal 23 and second seal 24 define an annular buffer zone or diluting fluid chamber 26 therebetween. A diluting or buffer liquid is forced into the buffer zone to flow through the first seal and mix with the liquid fluorine and the mixing or dilution occurs in the labyrinth seal 23 or the pressure chamber 25 so that no fluorine reaches the rubbing seal 24. Axially spaced from the second seal is a third rotary seal 27 of the rubbing face-to-face type and a purge chamber 28 is defined between the second and third seals 24 and 27. A purging fluid flows through the purge chamber to carry away lubricant that escapes through the third seal 27 and to carry away buffer fluid that escapes through the second seal 24.

As to the seal assembly in greater detail, an outer sleeve member 29 fits into a cylindrical bore 31 in the housing 8 and is held in place by cap screws 32 axially threaded into a shoulder within the housing outside of the bore 31. The sleeve member 29 has outwardly facing annular grooves in which are located sealing O-rings 33 and 34. At the end adjacent the pump rotor 9, the outer sleeve member has a series of annular grooves 36 to form the labyrinth seal 23. The raised portions between the grooves face a labyrinth seal ring 37 which is mounted on an inner sleeve member 38 that is mounted on a reduced portion 11a of the shaft and extends over a slightly larger portion 11b of the shaft to rotate therewith. An O-ring seal 39 is positioned at the shoulder formed between the portions 11a and 11b of the shaft. The shaft 11 has a larger portion 11c which may serve as the journal and be rotatably supported in a bearing surface 41 within the housing. Other bearing supports may also be provided as will be appreciated by those skilled in the art.

The seal ring 37 has a radial annular axially facing seal surface 37a which sealingly coacts with an axially facing annular surface 42a of a sealing ring 42 to form the second seal. The utilization of the ring 37 for both seals is a preferred form of structure, although as will be appreciated by those skilled in the art, in certain circumstances the second seal 24 may be provided as an entity separate from the ring 37.

The sealing ring 42 of the second seal 24 may be a non-frictional carbon ring or the like and is mounted on a carrier ring 43 which is supported within an outer ring 44. The outer ring has a groove and an O-ring 46 is positioned within the groove between the carrier ring 43 and the outer ring 44. The outer ring 44 is supported within the outer sleeve member 29. The assembly of members 42, 43, 44, and 46 forms a cartridge seal that effectively seals the buffer chamber 26 and prevents the flow of buffer fluid through the seal 24 and permits forcing buffer fluid through the first seal 23. A similar cartridge seal assembly is positioned on the other side of the purge chamber 28. Mounted on the portion 11b of the shaft is a rotating sealing ring 49 with an annular axially facing sealing surface 49a which coacts with an annular axially facing sealing surface of a non-rotating carbon sealing ring 51, the rings 49 and 51 forming the third seal 27. This seal prevents escape of oil from the shaft bearings into the purge chamber 28.

The carbon seal ring 51 is mounted on a carrier ring 52 inside of an outer ring 53 mounted within the outer sleeve member 29. An O-ring seal 54 is positioned in a groove in the outer ring 53 against the outer surface of the carrier ring 52.

The purge chamber 28 is supplied with a purging fluid such as air or nitrogen in the gaseous form. An inlet passage 57 extends through the housing to communicate with the purge chamber 28 and an outlet passage 58 also extends through the housing to permit the escape of purging fluid with the other fluids from the purging chamber. Purging fluid is supplied from a source 59 which may be a pressure chamber or a pump or similar supply source.

The buffer chamber 26 is supplied with a buffer liquid that is miscible with the liquid fluorine, which will not burn rubbing face-to-face seals and which will not substantially reduce the efficiency of the liquid fluorine as an oxidizer. Liquid oxygen is preferably used and supplied from a source 61 which may be a pump or a supply tank to be delivered through a passage 62 formed in the housing 8 and through a passage 63 formed in the outer sleeve 29, which communicates with the buffer zone 26. Thus, the buffer zone is formed so that a continual leakage flows through the labyrinth seal into the pressure zone 25 behind the pump impeller. Fluorine comes into contact only with the labyrinth seal 23 which has non-rubbing surfaces and will not come into contact with the second rotary seal 24 which does have rubbing surfaces. The mixing of the liquid oxygen with the fluorine is not detrimental inasmuch as liquid oxygen mixes freely with fluorine and can be burned along with liquid fluorine as an oxidizer such as in a rocket application. Liquid oxygen boils at −297° F., whereas liquid fluorine boils at −306° F., and therefore the problem of keeping the oxygen in a liquid state in the dilution or buffer zone 26 is not difficult.

Liquid nitrogen is used instead of liquid oxygen with greater safety. A small difficulty resides in the fact that the boiling point of nitrogen is lower than that of liquid fluorine (−320° F.) and should the amount of controllable dilution of the fluorine with nitrogen be significant it would result in some decrease in the performance of the fluorine as an oxidizer. Normally, with controlled dilution this reduction in performance would be negligible.

As a summary of operation, the shaft 11 is driven in rotation to rotate the impeller and pump liquid fluorine to the apparatus 4 which may include a fuel supply and a combustor for utilizing the liquid fluorine as an oxidizer. To prevent the liquid fluorine from burning the seal assembly, and also to positively prevent the leakage of any liquid fluorine, a buffer zone or a dilution zone 26 is formed between the first rotary non-rubbing seal 23 and the second rotary rubbing seal 24. A liquid miscible with fluorine which does not burn a rubbing seal and which does not materially reduce the oxidizing properties of the fluorine is forced between the two seals and axially through the first seal into the pressure zone 25 behind the impeller, positively preventing any liquid fluorine from reaching the rubbing seal 24. The third rotary seal 27 is of the rubbing type and prevents the leakage of oil along the shaft into the purge chamber 28 between the second and third seals. The flow of purging fluid such as air or gaseous nitrogen flows through the purging chamber to carry away any materials that have leaked past either the second or the third seal into the purge chamber 28.

Thus it will be seen that I have provided an improved pump assembly incorporating a seal arrangement of improved design which meets the objectives and advantages hereinbefore set forth. The assembly is suitable for high speed continuous operation and operates in complete safety preventing the escape of liquid fluorine. Furthermore, the rubbing seals are of the type having a long operating life and are provided with controlled liquid contact avoiding any opportunity of engagement by liquid fluorine. The labyrinth seals perform the primary sealing function for the pump and are not burned by contact with the fluorine.

It will be understood that modifications and variations may be effected without departing from the scope of the novel concepts of the present invention.

I claim as my invention:

1. The method of preventing the burning of seals in a liquid fluorine pump having a pump chamber housing a rotor carried on a shaft with a rotary seal which comprises forcing liquid oxygen in small quantities axially along the shaft away from the seal, restraining the fluorine and oxygen to a small annular zone around the shaft, and mixing the oxygen with the fluorine maintaining a flow of mixed fluorine and oxygen away from the seal to prevent contact of the seal by the fluorine and burning thereby.

2. The method of preventing the burning of seals in a liquid fluorine pump having a pump chamber housing a rotor carried on a shaft with a rotary seal which comprises forcing liquid nitrogen in small quantities axially along the shaft away from the seal, restraining the fluorine and nitrogen to a small annular zone around the shaft, and mixing the nitrogen with the fluorine maintaining a flow of mixed fluorine and nitrogen away from the seal to prevent contact of the seal by the fluorine and burning thereby.

3. The method of preventing the burning of seals in a liquid fluorine pump having a pump chamber housing a rotor carried on a shaft with a rotary seal which comprises forcing a substantially continuous flow of a small quantity of liquefied gas selected from the group consisting of oxygen and nitrogen axially along the shaft away from the seal into the pump chamber, and mixing the liquefied gas with the fluorine in the pump chamber.

4. The method of preventing burning of seals by fluorine in a liquid fluorine pump having a pump chamber housing a rotor carried on a shaft with rotary seals which comprises forcing a liquefied gas miscible with liquid fluorine along the shaft through the seals and into the pump chamber in small quantities to mix with the fluorine and prevent the escape of fluorine through the seal, said liquefied gas being non-corrosive with respect to the material of the seals.

5. The method of preventing the burning of seals by fluorine in a liquid fluorine pump having a pump chamber housing a rotor carried on a shaft with rotary seals which comprises providing a liquefied gas having a boiling point at least as high as fluorine which is miscible with the liquid fluorine, said liquid gas being non-corrosive with respect to material of the seals and being incapable of materially reducing the oxidizing efficiency of fluorine, and forcing said liquefied gas axially along the shaft away from the seals preventing the fluorine from contacting and burning the seals in small quantities to mix with the fluorine and prevent contact of fluorine with the seals.

6. The method of preventing the burning of seals by fluorine in a liquid fluorine pump having a pump chamber housing a rotor carried on a shaft with a plurality of rotary seals along the shaft which comprises forcing a liquefied gas miscible with liquid fluorine in small quantities axially along the shaft through an end seal adjacent the pump chamber and into the pump chamber to mix with the liquid fluorine and preventing the fluorine from engaging the seal next to the end seal, said liquefied gas being non-corrosive with respect to the material of said seal next to the end seal, and purging an area behind the seal next to the end seal with a flow of purging fluid to carry away liquefied gas escaping past said seal next to the end seal.

7. The method of preventing the burning of seals by fluorine in a liquid fluorine pump having a pump chamber housing a rotor carried on a shaft with a rotary seal which comprises providing a flow of liquefied gas miscible with fluorine having a liquefying temperature with the range of −275° F. and −335° F., said liquefied gas being miscible with fluorine and being incapable of corroding the rotary seal, forcing said flow in a small quantity relative to the liquid fluorine flowing through the pump axially along the pump shaft away from the seal and into the pump chamber, and mixing the liquefied gas with the fluorine in the pump chamber, to thereby prevent burning of the seal by the fluorine.

8. A rotary seal assembly for a pump having a pump shaft, a pump housing rotatably supporting said shaft and defining a pump pressure chamber and a peripheral discharge chamber therein, a pump rotor mounted on the pump shaft and positioned within the pump chamber, said seal assembly comprising a first rotary seal of the labyrinth type positioned adjacent the pump rotor and having a first seal part mounted on the shaft and a second seal part mounted on the housing, a second rotary seal spaced axially behind the first rotary seal with respect to the pump rotor and defining an annular buffer chamber therebetween, said second rotary seal being of the rubbing face-to-face type and having an annular seal ring with an axially facing sealing face mounted on the housing and in sealing engagement with an annular sealing face of said first seal part of said first annular seal, means defining a buffer fluid supply passage extending through the housing and communicating with said buffer chamber for forcing a flow of buffer fluid through said first seal into said pumping chamber so that the pumping fluid will not come in contact with said second rotary seal, a third rotary seal of the rubbing face-to-face type having a first part mounted on the shaft with an axially facing annular sealing surface and a sealing ring mounted on the housing and having an annular axially facing sealing surface in rubbing engagement with the first part, said second and said third rotary seals defining a purge chamber therebetween, means defining an inlet passage into said purge chamber, and means defining an outlet passage from said purge chamber so that a purging fluid can be forced through the purge chamber to remove lubricant which has leaked past said third seal and to remove fluid which has leaked past said second seal.

9. In a system for supplying an oxidizer to a combustion chamber including a liquid fluorine pump having a pump housing with an inlet and with an outlet connected to the combustion chamber, a pump chamber and a peripheral discharge chamber communicating with the pump chamber and outlet, a rotor within the pump chamber, and a shaft supporting the rotor, a first rotary seal of the non-rubbing type positioned axially adjacent the pump chamber between the shaft and housing, a second rotary seal spaced axially from the first seal and being of the rubbing rotating face type and defining a buffer chamber therebetween, fluid supply means connected to said dilution chamber for delivering a non seal-burning fluid miscible with liquid fluorine to the chamber and forcing the fluid through the first seal to mix with the liquid fluorine, a third rotary seal preventing the escape of lubricant axially along the shaft and spaced from the second seal and defining a purge chamber therebetween, and purging fluid passages communicating with the purge chamber for moving a purging fluid through said purge chamber to carry away lubricant escaping past said third seal and fluid escaping from the buffer chamber past said second seal.

10. A rotary shaft seal comprising in combination a rotary shaft extending into a pressure zone, a housing extending annularly around the shaft, a labyrinth seal mounted between the housing and rotary shaft adjacent the pressure zone, a face-to-face engaging sliding non-leaking rotating seal spaced axially from said labyrinth seal and including a first sealing member attached to the shaft having an annular sealing face and a second sealing member attached to the housing and having an annular sealing face sealingly engaging said first sealing face, means defining a dilution chamber between said labyrinth seal and said rotating seal, a dilution fluid supply means connected to said dilution chamber for forcing a continuous flow of fluid into the chamber and axially along the shaft through said labyrinth seal with said fluid flowing entirely into said pressure zone positively preventing the escape of fluid from the pressure zone through the labyrinth seal.

11. A rotary seal comprising in combination a rotary member extending to a pressure zone, a housing surrounding the rotary member, a first rotary seal between said housing and said rotary member positioned adjacent the pressure zone, a second rotary seal spaced axially from the first seal and defining a dilution chamber therebetween, fluid delivery means connected to said dilution chamber for forcing a continuous flow of dilution fluid into said chamber and axially through said first seal into the pressure zone, a third rotary seal spaced axially from said second seal and defining a purge chamber therebetween, means defining purge inlet and outlet passages connecting with said purge chamber, and means connected to said inlet passage for forcing a purging fluid through said purge chamber carrying away fluids leaking through said first and third seals into the purge chamber.

12. A rotary shaft seal comprising in combination a housing defining a pressure chamber to form a pressure zone therein, a rotary shaft within said housing extending to said pressure zone, a first rotary seal of the non-rubbing type positioned adjacent the pressure zone between the shaft and housing, a second rotary seal spaced axially from the first seal and being of the rubbing face type and defining a dilution chamber between the seals, dilution fluid supply means connected to the dilution chamber for forcing a continuous flow of diluting fluid into the chamber and through said first seal, a third rotary seal spaced axially from the second seal and being of the rubbing face type preventing the passage of lubricant and defining a purge chamber between said second and third seals, means defining purge inlet and outlet passages connected with said purge chamber, and means connected to said inlet passage for forcing a purging fluid through said purge chamber.

References Cited in the file of this patent
UNITED STATES PATENTS

| | | |
|---|---|---|
| 1,932,995 | Van Rijswijk | Oct. 31, 1933 |
| 2,131,927 | Wenzel | Oct. 4, 1938 |
| 2,451,261 | Warren et al. | Oct. 12, 1948 |
| 2,486,939 | Freund | Nov. 1, 1949 |
| 2,624,599 | Eaton | Jan. 6, 1953 |
| 2,764,945 | Heep | Oct. 2, 1956 |
| 2,816,417 | Bloomberg | Dec. 17, 1957 |